(12) United States Patent
Panda

(10) Patent No.: US 9,742,938 B2
(45) Date of Patent: Aug. 22, 2017

(54) PRINTING DEVICE SOFTWARE MANAGEMENT AND COMMON INTERFACE

(71) Applicant: KYOCERA Document Solutions Inc., Osaka (JP)

(72) Inventor: Debashis Panda, Pleasant Hill, CA (US)

(73) Assignee: KYOCERA Document Solutions Inc. (JP)

(*) Notice: Subject to any disclaimer, the term of this patent is extended or adjusted under 35 U.S.C. 154(b) by 0 days.

(21) Appl. No.: 15/224,849

(22) Filed: Aug. 1, 2016

(65) Prior Publication Data

US 2016/0344879 A1 Nov. 24, 2016

Related U.S. Application Data

(62) Division of application No. 14/671,308, filed on Mar. 27, 2015, now Pat. No. 9,430,723.

(51) Int. Cl.
*H04N 1/00* (2006.01)
*G06F 3/12* (2006.01)

(52) U.S. Cl.
CPC .......... *H04N 1/00344* (2013.01); *G06F 3/12* (2013.01); *G06F 3/121* (2013.01); *G06F 3/1232* (2013.01); *G06F 3/1247* (2013.01); *G06F 3/1285* (2013.01); *H04N 1/00347* (2013.01); *H04N 2201/0039* (2013.01); *H04N 2201/0094* (2013.01)

(58) Field of Classification Search
CPC .......... H04N 1/00344; H04N 1/00347; H04N 2201/0039; H04N 2201/0094; G06F 3/121; G06F 3/1232; G06F 3/1247; G06F 3/1285; G06F 3/12
USPC ...................................... 358/1.13
See application file for complete search history.

(56) References Cited

U.S. PATENT DOCUMENTS

| | | | |
|---|---|---|---|
| 6,965,931 B2 | 11/2005 | Helms | |
| 8,723,963 B2 | 5/2014 | Mohammad | |
| 2003/0123082 A1 | 7/2003 | Hall et al. | |
| 2004/0136023 A1* | 7/2004 | Sato | G06F 3/1205 358/1.13 |
| 2008/0246986 A1* | 10/2008 | Scrafford | H04L 41/12 358/1.15 |

(Continued)

*Primary Examiner* — Allen H Nguyen
(74) *Attorney, Agent, or Firm* — McDonnell Boehnen Hulbert & Berghoff LLP

(57) ABSTRACT

The present disclosure is directed to a method for managing printing device software. The method includes receiving, at a computing device, a request to print a document file. The method also includes receiving a selection of a particular printing device with which to print the document file. The method further includes performing a search operation to determine whether a printer driver for the particular printing device is stored on the first computing device. Additionally, the method includes causing a data transfer of the printer driver from a server onto the first computing device over a wide area network upon determining that the printer driver is not stored on the computing device. Further, the method includes converting, using the printer driver, the document file into a print job. The method also includes transmitting, to the particular printing device, instructions to execute the print job.

12 Claims, 9 Drawing Sheets

(56) References Cited

U.S. PATENT DOCUMENTS

2009/0179991 A1* 7/2009 Mohammad ....... H04N 1/00244
  348/207.2
2009/0190150 A1* 7/2009 Selvaraj ................ G06F 9/4411
  358/1.13
2010/0245885 A1  9/2010 Selvaraj
2015/0248263 A1* 9/2015 Hattori .................. G06F 3/1204
  358/1.15

* cited by examiner

PRINTING DEVICE SOFTWARE MANAGEMENT AND COMMON INTERFACE

CROSS-REFERENCE TO RELATED APPLICATION AND INCORPORATION BY REFERENCE

This application is a divisional application of and claims priority to U.S. patent application Ser. No. 14/671,308, filed in the United States Patent and Trademark Office on Mar. 27, 2015, which is incorporated herein by reference in its entirety.

BACKGROUND

Unless otherwise indicated herein, the materials described in this section are not prior art to the claims in this application and are not admitted to be prior art by inclusion in this section.

Typically, a computing device requires a printer driver installed thereon in order to interface with a printing device. The printer driver enables a computing device to convert a document into printable data for a particular printing device. In some scenarios—such as office environments—many different printing devices may be connected to a network, each requiring installation of a different printer driver. In these scenarios, a computing device typically needs to have installed thereon a printer driver for each of the printing devices.

Large office environments, for example, might have dozens—or perhaps hundreds—of printing devices within a network. Installing printer drivers for all printing devices on each user's computing device may take considerable time and effort. When all printer drivers are installed on a computing device, a print dialog may prompt a user to select a desired printing device from the list of all printing devices. Furthermore, a user may primarily print documents from a few printing devices, and thus require installation of only the few corresponding printer drivers; however, if a user wishes to print a document on a different printing device, that user must first install the corresponding driver.

When a guest device enters the network, that device must first install a printer driver prior to printing any documents. Moreover, as manufacturers provide updates to their printer drivers, each computing device typically must install the updated printer driver. Thus, requiring the installation of printer drivers for each device separately may be inefficient and time consuming.

SUMMARY

The present application discloses embodiments that relate to a device, system, and method for managing printing device software and providing a common interface between computing devices and printing devices. In one aspect, the present application describes a method. The method involves receiving, at a first computing device, a request to print a document file from a second computing device. The method also involves receiving a selection of a particular printing device with which to print the document file from the second computing device. The method further involves performing a search operation to determine whether a printer driver for the particular printing device is stored on the first computing device. Additionally, the method involves causing a data transfer of the printer driver from a server onto the first computing device over a wide area network upon determining that the printer driver is not stored on the first computing device. Further, the method involves converting, using the printer driver, the document file into a print job. The method also involves transmitting, to the particular printing device, instructions to execute the print job.

In another aspect, the present application describes a device. The device includes a network interface, a storage medium, and at least one processor. The network interface is configured to communicatively connect to a local network and a wide area network, wherein the local network includes one or more printing devices. The storage medium is configured to store one or more printer drivers. The at least one processor is configured execute instructions. The instructions include receiving, via the network interface, a request to print a document file. The instructions also include determining a particular printing device of the one or more printing devices with which to print the document file. The instructions further include determining whether a particular printer driver for the particular printing device is among the one or more printer drivers stored on the storage medium. Additionally, the instructions include upon determining that the particular printer driver is not stored on the storage medium, retrieving, via the network interface, the printer driver from a server over the wide area network. Further, the instructions include converting, using the particular printer driver, the document file into a print job. The instructions also include transmitting, to the particular printing device via the network interface, instructions to execute the print job.

In yet another aspect, the present application describes a system. The system includes a printer management device, one or more printing devices, and a computing device. The one or more printing devices are communicatively connected to the printer management device and configured to execute print jobs. The computing device is communicatively connected to the printer management device and configured to request printing of a document file. The printer management device is configured to store one or more printer drivers corresponding to the one or more printing devices. The printer management device is also configured to retrieve and store the updated version of the given printer driver from a server over a wide area network upon determining that an updated version of a given printer driver of the one or more printer drivers is available. The printer management device is further configured to convert the document file from the computing device into a print job using a particular printer driver of the stored one or more printer drivers. Additionally, the printer management device is configured to instruct a particular printing device of the one or more printing devices associated with the particular printer driver to execute the print job.

In still another aspect, the present application describes a system. The system includes a means for includes a means for receiving, at a first computing device, a request to print a document file from a second computing device. The system also includes a means for receiving a selection of a particular printing device with which to print the document file from the second computing device. The system further includes a means for performing a search operation to determine whether a printer driver for the particular printing device is stored on the first computing device. Additionally, the system includes a means for causing a data transfer of the printer driver from a server onto the first computing device over a wide area network upon determining that the printer driver is not stored on the first computing device. Further, the system includes a means for converting, using the printer driver, the document file into a print job. The system also includes a means for transmitting, to the particular printing device, instructions to execute the print job.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
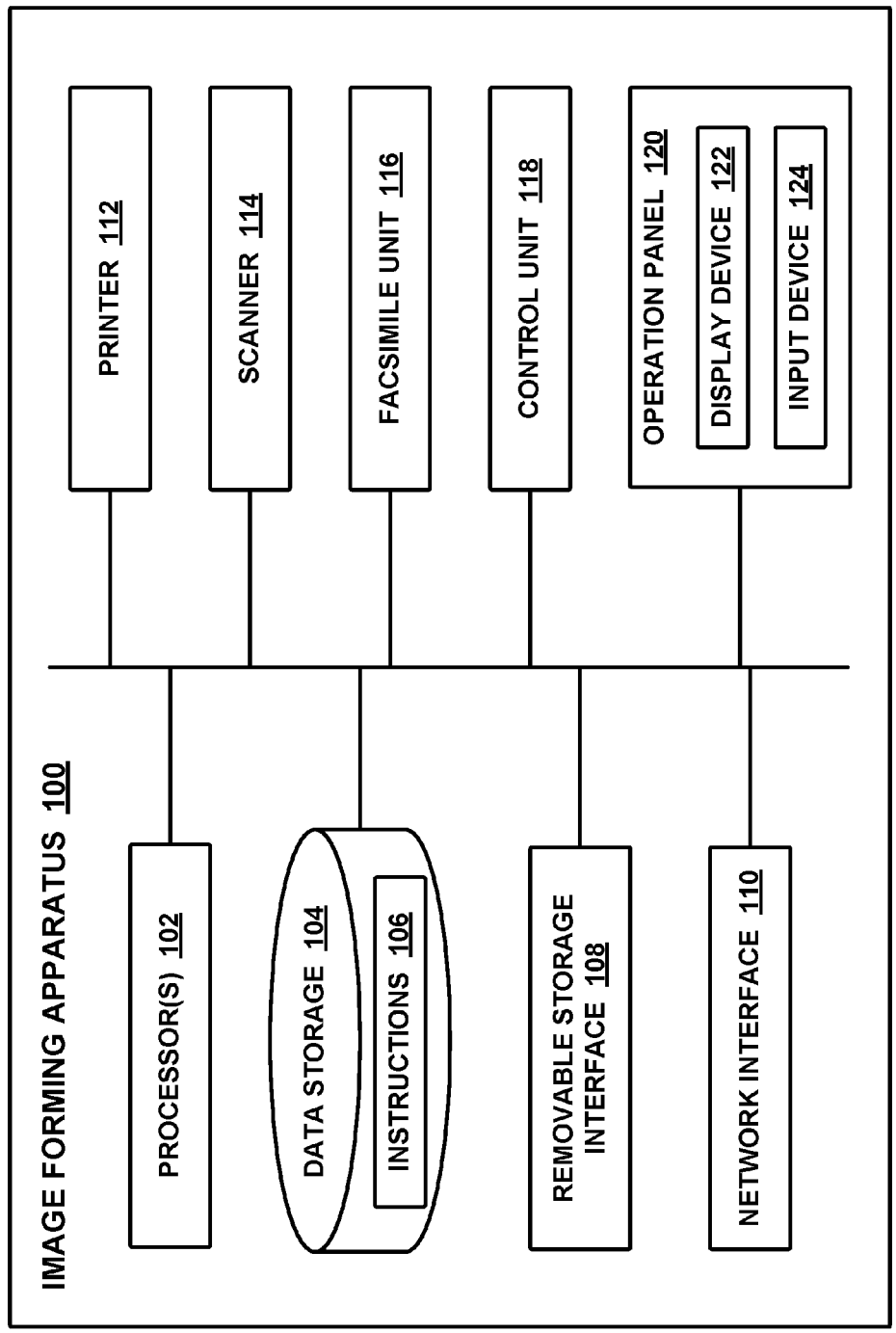
FIG. 1 is a schematic block diagram illustrating an image forming apparatus, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

An example embodiment involves managing printing device software and providing a common interface between computing devices and printing devices. A computing device—such as a printer management device as described herein—may be communicatively situated between computing devices on a network and printing devices on a network. Such a printer management device may have installed thereon printer drivers for each of the printing devices within the network. This printer management device may receive a document file from a computing device with a request to print that document file with a particular printing device. The printer management device may then generate a print job based on that received document file using the printer driver corresponding to that particular printing device installed thereon and transmit that print job to the particular printing device to be executed. Thus, a computing device communicating through the printer management device does not require installation of printer drivers in order to perform printing.

In some embodiments, the printer management device may automatically update the printer drivers as new versions of those drivers become available. The printer management device might periodically check for updates from a server or through a manufacturer's website. In some cases, the printer management device may receive a notification indicating that new drivers are available for download. Regardless of the implementation, the printer management device may download and install the latest printer drivers for each printing device within the network automatically.

Some printing devices may run a firmware, operating system, or other low-level software that controls various operational aspects of the printing device. The printer management device may store thereon copies of the latest firmware for various printing devices within the network. Similarly to the printer drivers, the printer management device may automatically download the latest versions of these firmwares as they become available. Upon downloading a newer firmware version, the printer management device may install the newer firmware on the corresponding printing device or devices. Note that "firmware" may refer to any combination of low-level software components, including drivers for various components of the printing device, memory management software, network interfacing software, and any other kind of operating system-type software.

When a new printing device is added to the network, the printer management device may detect that new printing device and determine whether software associated with that printing device is already installed and/or stored on the printer management device. If the printer driver and/or firmware is not already installed and/or stored, the printer management device may automatically download the missing software. Additionally, the printer management device might check the firmware on the new printing device and, in some situations, install a newer version of that firmware automatically.

The printer management device may, in some implementations, maintain status information for various printing devices on the network. When a particular printing device experiences an operational error, the printer management device may be notified of that error and prevent users from printing from that particular printing device.

The printer management device and methods of the present application provide an interface between computing devices and printing devices within a network. In this manner, computing devices do not require installation of printer drivers for each printing device within the network. Thus, even guest devices and/or mobile devices may be able to print from various printing devices within a network with such a printer management device, without having to install any printer drivers.

The printer management device may provide a variety of other benefits by acting as an intermediate device between computing devices and printing devices. For example, the printer management device might interface with cloud storage services in order to enable printing of document files stored on a remote server. The various benefits of providing such an intermediate device are contemplated herein.

II. Example Image Forming Apparatuses

FIG. 1 is a schematic block diagram of illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, which cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialing a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 112.

Figure 2:
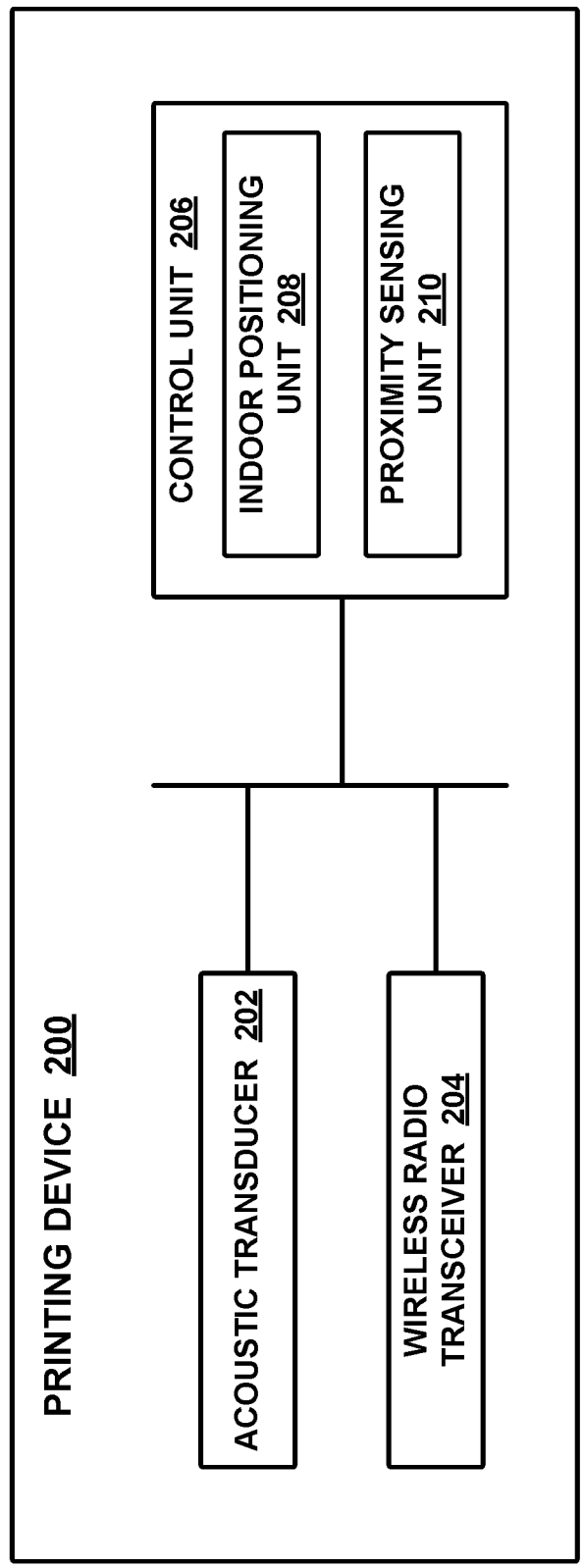
FIG. 2 is a schematic block diagram illustrating a printing device, according to an example embodiment.

FIG. 2 is a schematic block diagram illustrating a printing device 200, according to an example embodiment. The printing device 200 includes an acoustic transducer 202, a wireless radio transceiver 204, and a control unit 206. The control unit 206 may include indoor positioning unit 208 and proximity sensing unit 210. The printing device 200 may also include any combination of units of image forming apparatus 100.

The acoustic transducer 202 may be a device, such a speaker, capable of producing sound waves. The acoustic transducer 202 may be configured to emit sound waves within a particular frequency band. In some implementations, the acoustic transducer 202 may be a speaker capable of emitting ultrasound (e.g. 20 kHz to 80 kHz, among other possible frequencies). In other implementations, the acoustic transducer 202 may be a speaker capable of emitting infrasound (e.g. 5 Hz to 20 Hz, among other possible frequencies). Regardless of the particular implementation, the acoustic transducer 202 may be configured to emit human-inaudible sound waves. The acoustic transducer 202 may interface with the indoor position unit 208 in order to provide indoor positioning capabilities to assist a user in locating the printing device 200.

The wireless radio transceiver 204 may include an antenna and control circuit configured to emit electromagnetic waves of a particular frequency. The wireless radio transceiver 204 may emit any combination of Wi-Fi (including 802.11a/b/g/n/ac operating around 2.4 GHz and/or 5 GHz Wi-Fi bands, among other possible Wi-Fi standards), Wi-Fi Direct, and/or Bluetooth signals. Regardless of the particular implementation, the wireless radio transceiver 204 may be configured to emit electromagnetic signals detectable by, for example, mobile computing devices. The wireless radio transceiver 204 may interface with the indoor position unit 208 and/or the proximity sensing unit 210 in order to provide indoor positioning capabilities to assist a user in locating the printing device 200.

The control unit 206 may be a combination of hardware and/or software configured to control electrical and/or mechanical components of the printing device 200. The control unit 206 may be implemented as software instructions executed by a processor. In some embodiments, the control unit 206 may be implemented as firmware. Various operational aspects of the printing device 200 may be controlled through the control unit 206. Operations of printing device 200 may be invoked from instructions by a computing device, such as printer management device 300.

The indoor positioning unit 208 may control the acoustic transducer 202 and/or the wireless radio transceiver 204 in order to act as a basis for an indoor positioning system. As described herein with respect to FIG. 7 and FIG. 8, a printing device may emit sound waves and/or electromagnetic waves detectable by a mobile computing device. A user operating a mobile computing device may be guided to the printing device 200 emitting such sound and/or electromagnetic waves by an on-screen user interface, for example. During operation, the printer management device 300 may instruct the printing device 200—through the control unit 206 to the indoor positioning unit 208—to cause the acoustic transducer 202 to emit sound waves at a designated frequency and/or cause the wireless radio transceiver 204 to emit electromagnetic waves at a designated frequency or channel. A mobile computing device may then be informed to detect sound waves at that designated frequency and/or detect electromagnetic waves at that designated frequency or channel, and use certain aspects of those waves (i.e. the detected amplitude of those waves compared to a known emitted amplitude) in order to direct a user to the printing device 200.

The proximity sensing unit 210 may operate in conjunction with indoor positioning unit 208 in order to provide indoor positioning. In some implementations, the wireless radio transceiver 204 may also receive signals from a mobile computing device. The proximity sensing unit 210 may estimate the distance between the printing device 200 and the mobile computing device based on the relative amplitudes of exchanged electromagnetic waves.

Note that a "unit" as referred to herein may refer to a device, component, module, or other combination of electrical and/or mechanical elements that accomplish a particular task. In some instances, a unit may refer to a physical device that performs certain activities, such as the facsimile unit 116. In other instances, a unit may refer to a software module that executes operations for a certain purpose, such as the indoor positioning unit 208. Regardless of the combination of hardware and software components that make up a unit, it should be understood that units are operable to accomplish certain tasks, and may interact with other units through hardware and/or software interfaces.

Image forming apparatuses and printing devices referred to herein may incorporate any combination of components from image forming apparatus 100 and/or printing device 200, among other possible components. For instance, an image forming apparatus may include a power supply that converts electrical power for use by various components. It should be understood that other additional components might also be included on a particular image forming apparatus.

Figure 3:
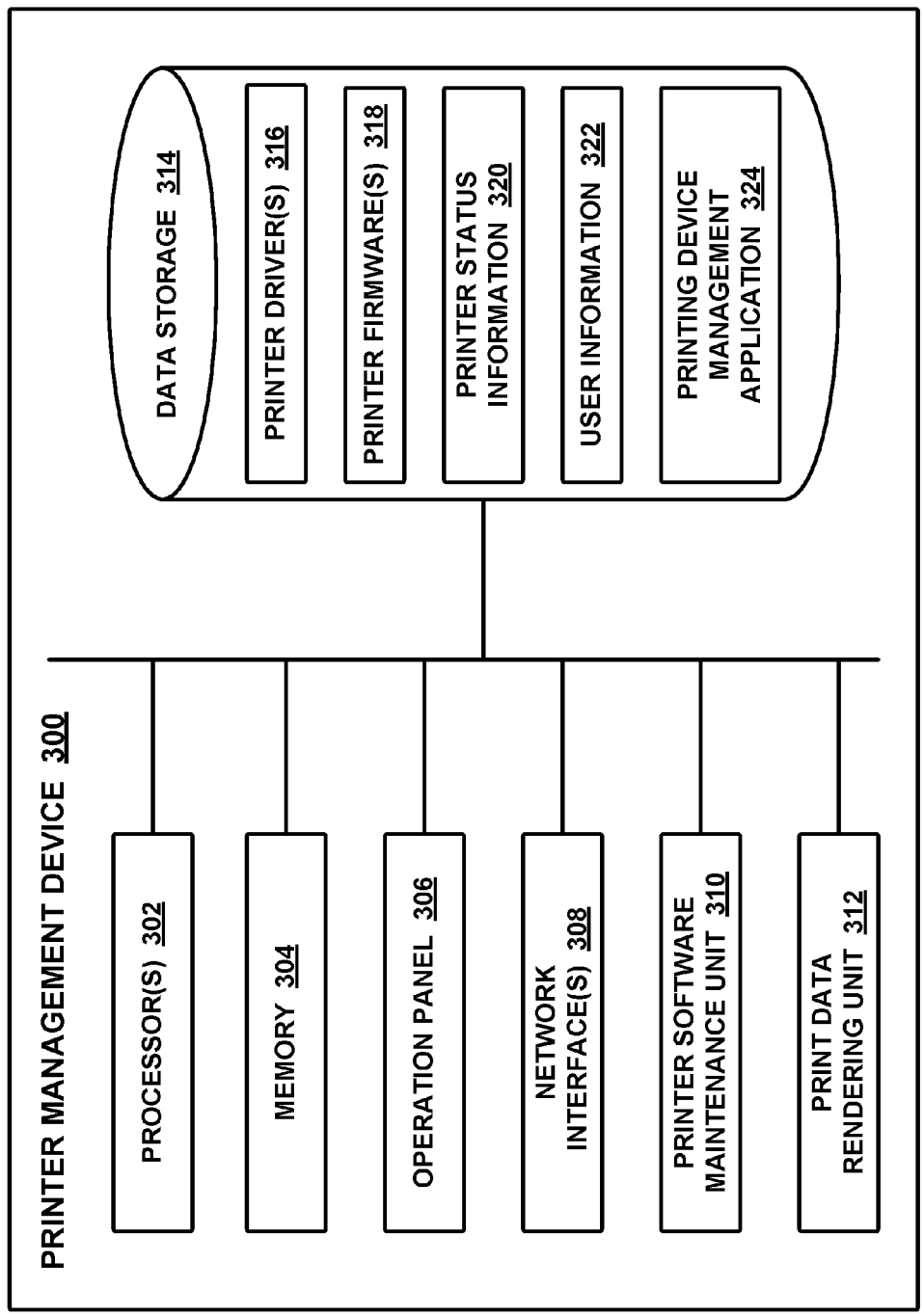
FIG. 3 is a schematic block diagram illustrating a printer management device, according to an example embodiment.

FIG. 3 is a schematic block diagram illustrating a printer management device 300, according to an example embodiment. The printer management computing device includes processor(s) 302, memory 304, operation panel 306, network interface(s) 308, printer software maintenance unit 310, print data rendering unit 312, and data storage 314. The data storage 314 may include printer driver(s) 316, printer firmware(s) 318, printer status information 320, user information 322, and printing device management application 324.

The processor(s) 302 may include one or more processors capable of executing software, such as printing device management application 324, which cause the printer management device 300 to perform various operations. The processor(s) 302 may include general-purpose central processing units (CPUs) and cache memory. The processor(s) 302 may also incorporate processing units for specific purposes, such as application-specific integrated circuits (ASICs) and field-programmable gate arrays (FPGAs). Other processors may also be included for executing operations particular to printer management device 300.

The memory 304 may be any volatile storage device—such as random-access memory (RAM)—that provides a temporary storage location and memory space for software executed on the printer management device 300.

The operation panel 306 may be any combination of software and/or hardware that provides an interface through which a user can perform various operations of the printer management device 300. In some implementations, the operation panel 306 may include a display unit—such as a liquid crystal display (LCD)—and an input unit (e.g. a touch-screen digitizer, a mouse, a keyboard, and/or other buttons). The operation panel 306 may display thereon a user interface through which various operations may be performed. For example, the operation panel 306 may present a navigable interface through which a user can view the operational status of various printing devices on the network.

In some embodiments, the operation panel 306 may be implemented in software without a separate hardware component. In these embodiments, the user interface elements of the operation panel 306 may be transmitted to a user's computing device and remotely displayed thereon. In some cases, the operation panel 306 may be configured on a per-user basis, such that each user may be presented with a personalized operation panel 306 on that user's computing device.

In some implementations, a client device or a mobile computing device may run a program or application that displays such a remote operation panel. The printer management device 300 may transmit information about the user's preferences to the client device or mobile computing device. Some example operations that can be performed via the operation panel include checking the status of various printing devices, configuring preferred printing devices for a particular user, directing failed print jobs to alternative printing devices, and executing maintenance operations, among other possible operations.

The network interface(s) 308 may be any combination of wired Ethernet, Wi-Fi (e.g. 802.11a/b/g/n/ac operating in the 2.4 GHz and/or 5 GHz Wi-Fi bands, among other possible Wi-Fi standards), Wi-Fi Direct, Bluetooth, and/or any other wired or wireless communication standard. The network interface(s) may provide communicative connections to computing devices and printing devices within a particular network. The printer management device 300 may connect to a local network through the network interface(s) 308. In some implementations, a computing device may communicate directly to the printer management device 300 over Wi-Fi Direct or Bluetooth, without being connected to such a local network.

The printer software maintenance unit 310 may perform downloading, updating, and installation of various printer software on the printer management device 300 and/or on printing devices within the network. The printer software maintenance unit 310 may update the printer driver(s) 316 and/or the printer firmware(s) 318 when newer versions of those drivers or firmwares become available. In some cases, the printer software maintenance unit 310 may receive notifications that newer versions of printer driver(s) 316 and/or the printer firmware(s) 318 are available and responsively request to download those drivers or firmwares. Additionally, the printer software maintenance unit 310 may detect the addition of a new printing device on the local network and may responsively request to download the printer driver and/or firmware associated with that new printing device.

The print data rendering unit 312 may convert document files into printable data (which may also be referred to herein as "print jobs") using printer driver(s) 316. Such a conversion might involve color conversion, rasterization, and other techniques to interpret a document file and convert that information into data that can be understood and printed by a printing device. In some implementations, the print data rendering unit 312 may also configure print jobs based on received print job settings (e.g. duplex, color, stapling, and/or paper size options, among other print job settings). A user requesting to print a document file may specify one or more of these print job settings, which may be received at the print data rendering unit 312 and used as a basis to configure the printing options for the print job. In some cases, the print data rendering unit 312 may apply default print job settings for a particular printing device when none are otherwise specified.

The data storage 314 may store thereon instructions 106, which are executable by the processor(s) 302. The data storage 314 may also store information for various programs and applications, as well as data specific to the printer management device 300. For example, the data storage 314 may include data for running an operating system (OS). In addition, the data storage 314 may store user data that includes various kinds of information about any number of users. The data storage 314 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 314 may include any combination of readable and/or writable volatile memories and/or non-volatile memories, along with other possible memory devices.

The printer driver(s) 316 may be one or more printer drivers corresponding to printing devices connected to a local network. In some cases, the printer management device 300 may store printer drivers for all printing devices provided by a particular manufacturer. In various implementations, the printer driver(s) 316 may be updated automatically. Additionally, when a new printing device connects to the local network, the printer driver for that printing device may be automatically downloaded and included within the printer driver(s) 316.

The printer firmware(s) 318 may be one or more printer firmwares corresponding to printing devices connected to a local network. In some cases, the printer management device 300 may store printer firmwares for all printing devices provided by a particular manufacturer. In various implementations, the printer firmware(s) 318 may be updated automatically. Additionally, when a new printing device connects to the local network, the printer firmware for that printing device may be automatically downloaded and included within the printer firmware(s) 318.

In some implementations, the data storage 314 may store a table or database cataloguing the printer driver(s) 316 and printer firmware(s) 318 stored thereon. Such a table or database may include information about printing device models and the version of the currently stored drivers and firmwares for each model. When a new printing device connects to the network, the printer management device 300 may check the table or database to first determine whether the printer drivers and firmware are already stored on the data storage 314.

The printer status information 320 may be maintained by the printer management device 300 and used as a basis to determine whether or not a particular printing device is available for printing. Some example information that may be included within printer status information 320 includes whether a printing device is currently printing, a number of "spooled" print jobs for a printing device, the ink and/or toner levels of a printing device, and/or whether an error (e.g. a paper jam) has occurred on a printing device. This information may be gathered by the printer management device 300 by sending queries to each printing device connected to the network and receiving responses containing each printing device's status information. Some printing devices may also transmit status information to the printer management device 300 in certain circumstances (e.g. when an error occurs that prohibits execution of print jobs until that error is addressed). Regardless of the manner in which the printer management device 300 receives the printer status information 320, the printer management device 300 may use such information in order to prevent users from printing at unavailable (e.g. busy or offline) printing devices. In some embodiments, the printer management device 300 may automatically redirect a print job if an originally-designated printing device is unavailable.

The user information 322 may include credentials, preferences, and other information associated with one or more users. The printer management device 300 may provide personalized services to registered users, such as a customized operation panel 306. As another example, user information 322 may include information pertaining to a user's printing history and/or a user's preferred printing devices, among other possible information. The user information 322 may be used as a basis to authenticate a user. In some implementations, one or more client devices and/or mobile computing devices may be associated with a given user, such that when a user operates those client devices or mobile computing devices, personalized options are provided thereto.

In some embodiments, the printer management device 300 may require a user to be authenticated before executing a print job. In some circumstances, it may be desired to prevent unauthorized or unauthenticated users from printing through the printer management device. Thus, the printer management device 300 may first determine whether a user requesting execution of a print job is authenticated or authorized to perform printing. If a user is unrecognized or otherwise not authenticated or authorized to perform printing, the printer management device 300 may prevent or otherwise stop the transmission of the print job to a printing device.

The printing device management application 324 may be any combination of software, programs, applications, and/or services configured to perform the various operational functions of the printer management device 300 as described herein. The printing device management application 324 may interface with the printer software maintenance unit 310 to update printer driver(s) 316, printer firmware(s) 318, and/or printer status information 320. The printing device management application 324 may also utilize the printer driver(s) 316 and the print data rendering unit 312 in order to generate print jobs based on received document files. The printing device management application 324 may include software modules for executing operations and methods of the printer management device 300 described in the present application.

The printer management device 300 may be referred to herein as a "printing box" and/or a "universal printing box." It should be understood that "box" may refer to an example form factor of such a printer management device 300, according to some implementations. It should also be understood that "universal" refers to the printer management device's role as a central hub that may facilitate any combination of software updates, software installations, printing, and data access over a local network and/or wide area network. The term "universal" may simply be used to designate the printer management device from other computing devices, such as client devices, desktop computers, mobile computing devices, and tablet devices.

III. EXAMPLE SYSTEMS

Figure 4A:
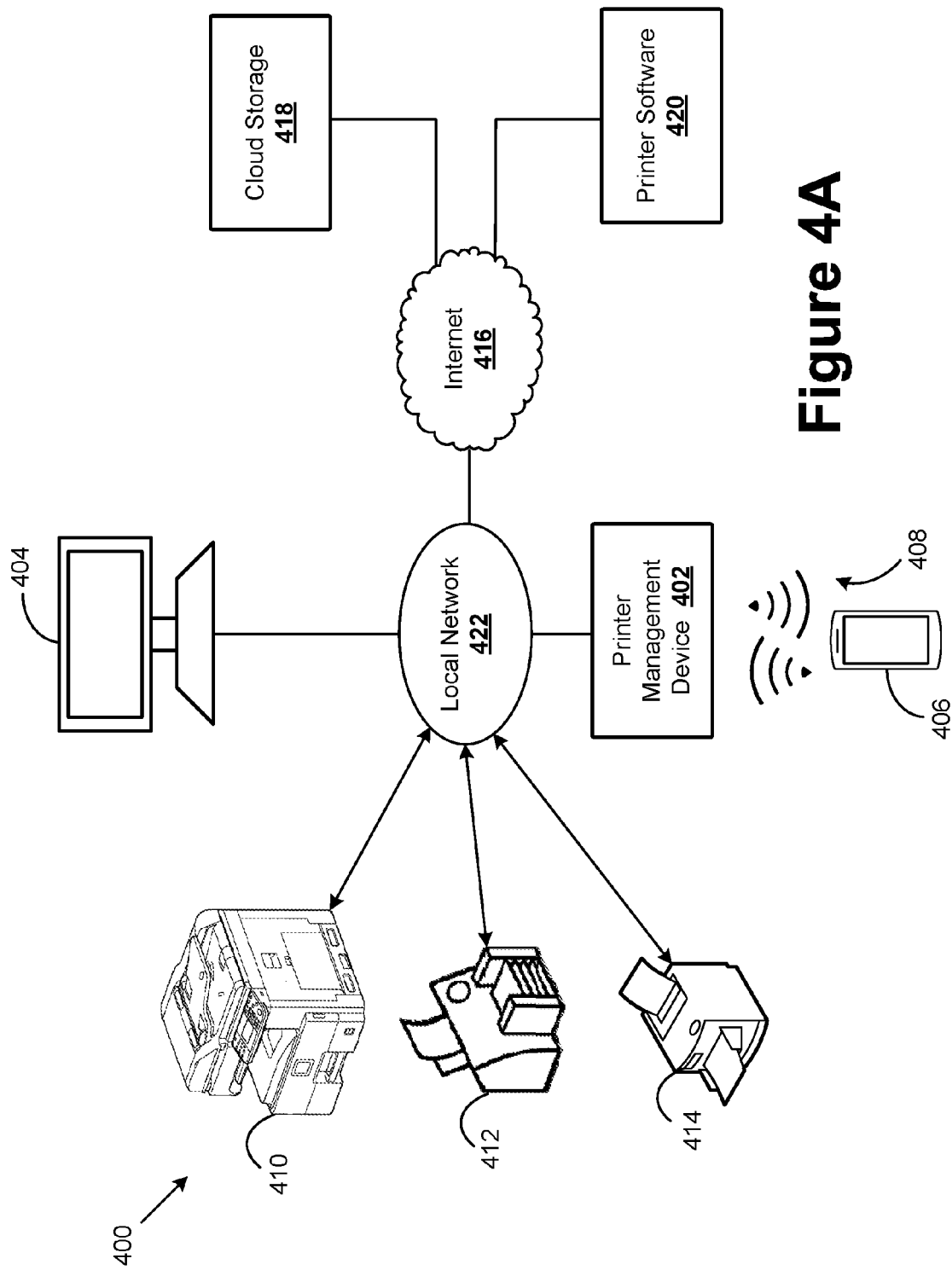
FIG. 4A is a schematic block diagram illustrating a system, according to an example embodiment.

FIG. 4A is a schematic block diagram illustrating a system 400, according to an example embodiment. The system 400 includes printer management device 402, client device 404, mobile computing device 406, first printing device 410, second printing device 412, third printing device 414, cloud storage 418, and printer software 420. The printer management device 402, client device 404, mobile computing device 406, and printing devices 410, 412, and 416 may be communicatively connected within local network 422. The printer management device 402 may also be communicatively connected to the cloud storage 418 and printer software 420 over the Internet 416.

The printer management device 402 may be the same as or similar to the printer management device 300 described above with respect to FIG. 3. The printer management device 402 may provide a common interface through which computing devices can execute print jobs on printing devices 410, 412, and 414 without requiring installation of printer drivers for those printing devices. During operation, a computing device requesting execution of a print job may transmit a document file over the local network 422 to the printer management device 402, which may then generate the print job and transmit that generated print job over to one or more of the printing devices 410, 412, and 414.

The client device 404 may be a desktop computing device connected to the printer management device 402 over local network 422. In some configurations, the client device may be connected to local network 422 over a wired connection, such as Ethernet. The client device 404 might have local storage containing document files, from which a user may select a particular document file to be printed. The client device 404 might also request printing of documents stored in the cloud storage 418. In some cases, the client device 404 may not have any printer drivers stored thereon.

The mobile computing device 406 may be a smartphone or tablet device wirelessly connected to the printer management device 402. The wireless connection 408 may be Wi-Fi, Wi-Fi Direct, and/or Bluetooth, among other possible wireless communication standards. In some instances where an administrator wishes to keep a local network secure and only permit trusted users to connect thereto, the mobile computing device 406 may connect directly—over Wi-Fi Direct or Bluetooth—to the printer management device 402. This may be desired when a mobile computing device is associated with a guest user, for example. The mobile computing device 406 may have document files stored on local storage and request printing of such locally-stored document files through the printer management device 402. In some instances, the mobile computing device 406 may request printing of one or more documents stored in the cloud storage 418.

In some configurations the mobile computing device 406 may alternatively and/or additionally be wirelessly connected to the local network 422. For example, the mobile computing device 406 may be associated with an employee that commonly works within a given office environment. In this example, the mobile computing device 406 may be permitted access to the local network 422 (i.e. has network credentials necessary to be authenticated and connected to the local network 422). However, if the mobile computing device 406 is associated with a guest user that does not require access to the local network 422, it may be connected wirelessly directly to the printer management device 402, as shown in FIG. 4A.

The printing devices 410, 412, and 414 may be various kinds of image forming apparatuses capable of executing print jobs. Each printing device might have installed thereon a firmware of a particular version. The printer management device 402 may download updated version of those firmwares and install them on the printing devices upon completion of those downloads. The printing devices 410, 412, and 414 may be configured to transmit information about the printing device to the printer management device 402 via the local network 422. For example, the printer management device 402 may request information about the model of a printing device, or may also request the version information of the firmware currently installed on a printing device. The printing devices 410, 412, and 414 may respond to such requests with the requested-for information. Furthermore, in some embodiments, one or more of the printing devices 410, 412, and 414 may transmit status information about various operational aspects of the printing device to the printer management device 402.

Certain printing devices, such as the first printing device 410, may be multi-function peripherals (WI's) capable of performing other functions, such as scanning and/or facsimile operations. In some embodiments, scan data produced from a scanned document at the first printing device 410 may be sent to the printer management device 402. The printer management device 402 may store the scan data temporarily or for a long duration, depending on the particular embodiment. In some cases, the printer management device 402 may forward on the scan data to one or more client devices and/or mobile computing devices.

In some implementations, the printer management device 402 may email the scan data to one or more email addresses upon receiving the scan data. In some embodiments, the printer management device 402 may be configured to transmit the scan data for storage on a remote server or to cloud storage 418.

The Internet 416 may be any wide area network through which the printer management device 402, the cloud storage 418, and the printer software 420 are communicatively connected.

The cloud storage device 418 may be a storage device of a server that stores document files. The client device 404 and/or the mobile computing device 406 may view the document files stored on the cloud storage 418 and request the printing of one or more of those documents through the printer management device 402. In some cases, the cloud storage may be a private or commercial cloud storage service. In some implementations, requesting to print a document file from cloud storage 418 may involve transmitting a link or other reference to the printer management device 402 to that remotely-stored document file. Such a request may also include login credentials required to authenticate the user before retrieving documents stored the cloud storage 418. Then, printer management device 402 may generate a print job based on the retrieved document file from the cloud storage 418.

The printer software 420 may be any combination of printer drivers and/or printer firmware stored on a remote server. The printer software 420 may be server provided by a printing device manufacturer. In some cases, the printer management device 402 may request version information of drivers and/or firmware from the printer software 420. If newer versions of the drivers and/or firmware become available, the printer management device 402 may request to download those newer drivers and/or firmware from the printer software 420. In some implementations, the printer software 420 may notify the printer management device 402 that newer versions of drivers and/or firmware have been uploaded and are available for download.

In various implementations, a printer management device 402 may be configured to responsively "pull" or otherwise retrieve printing device drivers upon detecting a newly connected printing device. Note that, although the following discussion describes automatic retrieval and updating of printer drivers, it should be understood that such operations may be applied to other printer software as well, such as printing device firmwares. When a new printing device connects to the network, the printer management device 402 may obtain an IP address of that newly connected printing device. Then, the printer management device 402 might detect the type and/or model of that newly connected printing device. In some implementations, the printing device might provide information such as its serial number, model number, and/or manufacturer in response to a request for such information.

The printer management device 402 might then determine whether the drivers for that printing device are already stored thereon. If the drivers are not stored on the printer management device, the printer management device 402 may initiate the download or request to download the drivers. If a printer driver for that newly connected printing device is already stored on the printer management device 402, the printer management device 402 may check to ensure that it is the most current version of the printer driver. If a newer version is available, the printer management device may, in some implementations, download the newer version.

The printer management device 402 may also determine whether the latest firmware is installed on the printing device. If the version of the currently-installed firmware is older than the version of the firmware stored on the printer management device 402, the printer management device may install the stored firmware onto the newly connected printing device.

The local network 422 may be provided with a combination of routers and/or network switches that are configured to provide a local network connection for the client device 404, the mobile computing device 406 (in some cases), and the printing device 410, 412, and 414. It should be understood that the local network may include a variety of computing and/or routing devices that collectively form the local network 422. Certain devices, such as client device 404, may be connected to the local network 422 over a wired connection (e.g. over Ethernet). Other devices, such as mobile computing device 406 (in some cases), may connect to the local network 422 over a wireless connection (e.g. over Wi-Fi, among other possible wireless connection standards). The local network 422 may be referred to as a "local area network" (LAN) herein.

It should be understood that the system 400 is an example system that is provided for explanatory purposes. Any combination of mobile devices, computers, laptops, servers, storage devices, and/or other terminal apparatuses connected in a variety of ways may be implemented within a particular system. Certain devices shown within system 400 in FIG. 4A may or may not be required to carry out various methods of the present application; that is, some methods of the present application might not require every device shown in FIG. 4A to be present within system 400.

Figure 4B:
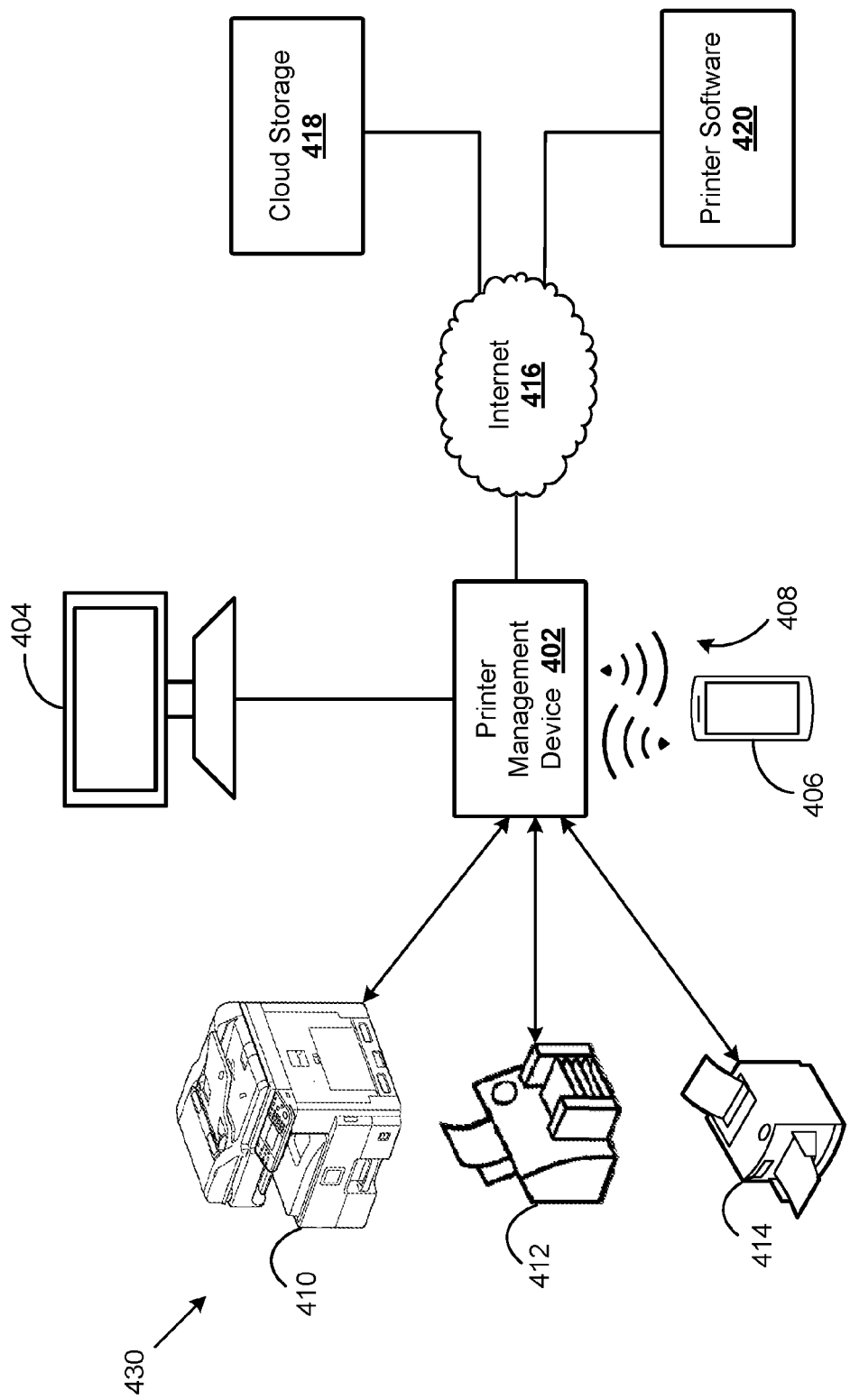
FIG. 4B is a schematic block diagram illustrating a system, according to an example embodiment.

FIG. 4B is a schematic block diagram illustrating a system 430, according to an example embodiment. The system 430 is similar to system 400 shown in FIG. 4A, except that the local network 422 is omitted in system 430. In some scenarios, an administrator may wish to keep devices connected within an environment secure. In these scenarios, the printer management device 402 may serve as an access point through which devices within the network can communicate with each other. As illustrated in FIG. 4B, the printer management device 402 may be communicatively situated between the computing devices—such as the client device 404 and the mobile computing device 406—and the printing devices 410, 412, and 414. Additionally, in order to access the cloud storage 418 and/or printer software 420 via the Internet 416, one or more of the devices may first need to communicate through the printer management device 402. In this manner, the security of the printing devices 410, 412, and 414, as well as the client device 404 and mobile device 406, can be improved.

In some embodiments, the printer management device 402 may act to filter out unauthorized or unsecured connections from over the Internet 406 to a computing device or printing device within system 430. Thus, a computing device and/or printing device within system 430 that wishes to execute a print job based on a document file from cloud storage 418 must request to do so through the printer management device 402. In this manner, the printer management device 402 may determine whether or not requested document files within the cloud storage 418 are safe, and may prevent the downloading of potentially dangerous document files (e.g. those that might contain malware, viruses, or other cyber threats).

It should be understood that a system of the present application may be any combination of devices and networks in system 400 in FIG. 4A and system 430 in FIG. 4B. For example, the printer management device 402 may directly connect (over a wired and/or wireless connection) to one or more of the printing devices 410, 412, and 414, which may then connect to local network 422. That local network 422 may have connected therein other printing devices and/or computing devices. Thus, any combination of local network connections and printer management device 402 connections may exist, depending upon the particular embodiment.

IV. EXAMPLE METHODS

Figure 5:
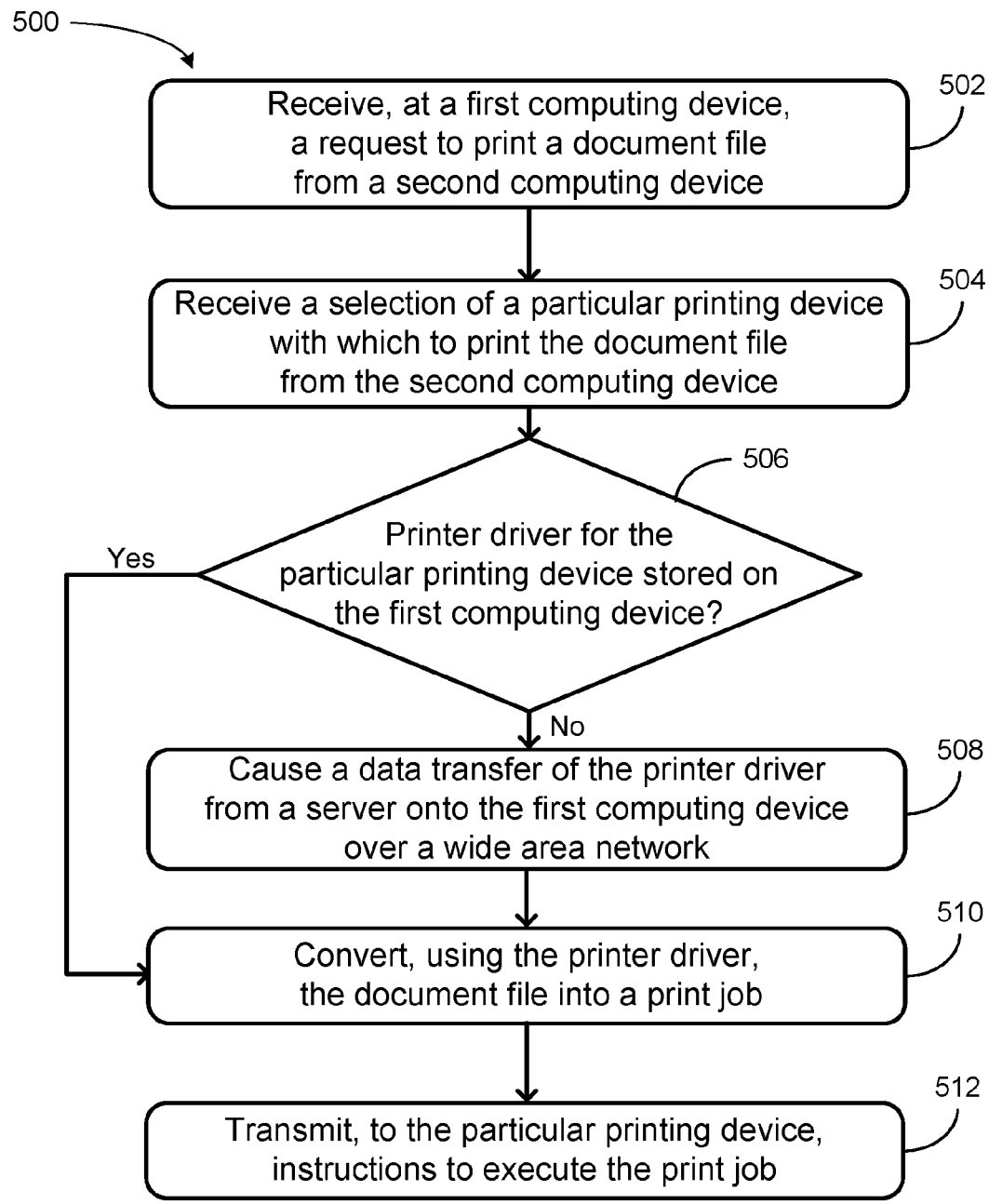
FIG. 5 is a flowchart illustrating a method, according to an example embodiment.

FIG. 5 is a flowchart illustrating a method 500, according to an example embodiment. The method 500 may be one example set of operations that collectively performs printing of a document through a printer management device. Operations of method 500 may, for example, be performed on printer management device 300 shown in FIG. 3 or on printer management device 402 shown in FIG. 4A and/or FIG. 4B.

At step 502, the method 500 involves receiving, at a first computing device, a request to print a document file from a second computing device. The first computing device may be a printer management device as described above. The second computing device may be a client device or a mobile computing device, among other possible computing devices. The request to print a document file may, in some cases, include print job settings indicative of desired settings with which to print the document file. The document file may be received over a wired or wireless communication standard.

At step 504, the method 500 involves receiving a selection of a particular printing device with which to print the document file from the second computing device. In some instances, the request to print the document file may contain a selection of a desired printing device. In other instances, a user may not designate a printing device, in which case a particular printing device may be selected automatically based on the second computing device's relative location within the network, the second computing device's printing history, and/or preferences of a user associated with the second computing device.

At step 506, the method 500 involves determining whether a printer driver for the particular printing device is stored on the first computing device. This may involve searching the stored printer drivers to determine if the printer driver associated with the particular printing device is already stored. In some implementations, a table or database of printer drivers may be stored on the first computing device, and step 506 might involve querying that table or database using, for example, model or serial information of that particular printing device. If the printer driver is not already stored on the first computing device, the method 500 advances to step 508. If the printer driver is stored on the first computing device, the method 500 skips step 508 and advances to step 510.

At step 508, the method 500 involves causing a data transfer of the printer driver from a server onto the first computing device over a wide area network. This step might involve requesting to download a copy of the printer driver from the server. The server may responsively initiate a transmission of the printer driver from the server to the first computing device. As one example, the transmission of the printer driver may be performed as an HTTP data transfer. As another example, the transmission of the printer driver may be performed as an FTP data transfer. It should be understood that, as described herein, "causing a data transfer" refers to the first computing device either requesting or initiating a download of software from a server. In various embodiments, the first computing device may or may not facilitate that actual transfer of the information.

At step 510, the method 500 involves converting, using the printer driver, the document file into a print job. As described above, converting a document file into a print job may involve utilizing the printer driver to convert the document file data into a format that can be understood and interpreted by the particular printing device. In some instances, this step may additionally involve applying specified print job settings (e.g. duplex settings, color settings, stapling settings, etc.) to produce a configured print job. In some cases, a user may specify print job settings that are unavailable for a particular printing device; in these cases, the user may be notified that those print job settings cannot be applied, or those settings may be ignored. In some implementations, a print dialog may be provided to the user that displays configurable options based on the printer driver, which may specify possible configurable print job settings for the particular printing device.

At step 512, the method 500 involves transmitting, to the particular printing device, instructions to execute the print job. Step 512 may involve transmitting the print job, along with any associated print settings (depending upon whether they are specified or incorporated within the print job), to the particular printing device. In some implementations, step 512 may also involve transmitting a command to execute the print job.

In some embodiments, a printer management device may spool or otherwise queue multiple print jobs. In these embodiments, step 512 might involve queuing the print job behind previously-requested print jobs, and transmitting the print job for execution after completion of those previously-requested print jobs. In some cases, the particular printing device may implement such spooling or queuing.

It should be understood that the steps 502-512 might be performed in a different order than that presented in FIG. 5. Various steps and operations may be performed in parallel as well. The order of the operations depicted is provided for explanatory reasons and is merely one example combination of operations for executing a print job using a printer management device.

Figure 6:
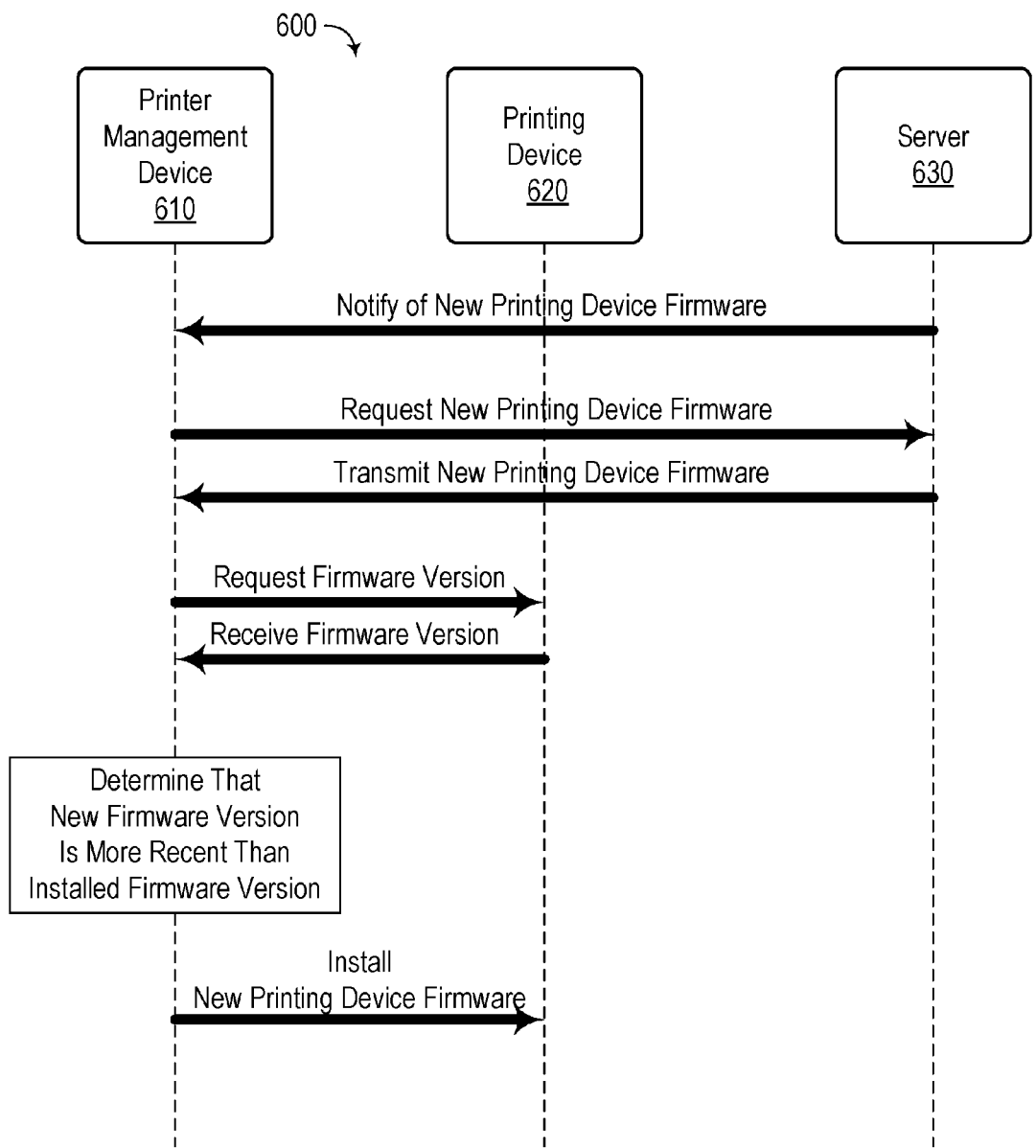
FIG. 6 is a data flow diagram illustrating a method, according to an example embodiment.

FIG. 6 is a data flow diagram 600 illustrating a method, according to an example embodiment. The data flow diagram 600 depicts information passing among the printer management device 610, printing device 620, and server 630. More specifically, the data flow diagram 600 depicts a process through which new printing device firmware is updated and installed on the printing device 620 using printer management device 610. Note that the data flow diagram 600 merely depicts an example of data flow among the devices in the system; in various implementations, fewer or additional devices may be present and fewer or additional steps may be performed different from those depicted in FIG. 6 to accomplish the printer firmware updating and installation disclosed in the present application.

First, the server 630 notifies the printer management device 610 that a new printing device firmware is available. This may occur when, for example, a manufacturer of the printing device publishes a new printing device firmware. In some implementations, the manufacturer may send out notifications to one or more computing devices—such as printer management device 610—informing those computing devices that a newer printing device firmware is available for download. This notification may include version information for the newly published printing device firmware.

It should be understood that a "version" as referred to herein may be denoted using any combination of alphabetical and/or numeric characters. A "version" indicates a particular release of a piece of software. Thus, a "newer" version indicates a release of software that occurs after a release of a previous version. Comparison of the version information may involve a numerical comparison to determine which is the newest version. In some cases, no explicit version information may be provided, in which case the release or publication date of a particular piece of software may constitute its version.

Then, the printer management device 610 requests the new printing device firmware from the server 630. The server 630 then responsively transmits the new printing device firmware to the printer management device 610. The printer management device 610 may store a copy of the new printing device firmware on a data storage device for potential future use.

Then, the printer management device 610 sends a request to the printing device 620 for the version of the firmware currently installed on the printing device 620. Responsive to receiving the request, the printing device 620 then sends the version information of the currently installed firmware to the printer management device 610.

Then, the printer management device 610 determines whether the new firmware version is more recent than the installed firmware version. In some implementations, this may involve comparing the publication or release date of the currently installed firmware to that of the new printing device firmware.

Upon determining that the new firmware version is more recent than the firmware installed on the printing device 620, the printer management device 610 installs the new printing device firmware onto the printing device 620. As one example implementation, this may involve transmitting a copy of the new printing device firmware to a temporary storage location of the printing device 620. The printer management device 610 may then instruct printing device 620 to "flash" or otherwise install the new printing device firmware.

Note that certain steps depicted in FIG. 6 may be omitted and/or other steps may be added, depending on the particular embodiment. In some implementations, some steps may be performed in parallel; for example, requesting to download the new printing device firmware from server 630 and requesting the firmware version from the printing device 620 may be performed simultaneously. The retrieval of information may be blocking or non-blocking, depending upon the particular implementation. For instance, because receiving the new printing device firmware might take time to complete, the printer management device 610 may simultaneously request the firmware version from printing device 620 during the download.

IV. EXAMPLE INDOOR POSITIONING

Figure 7:
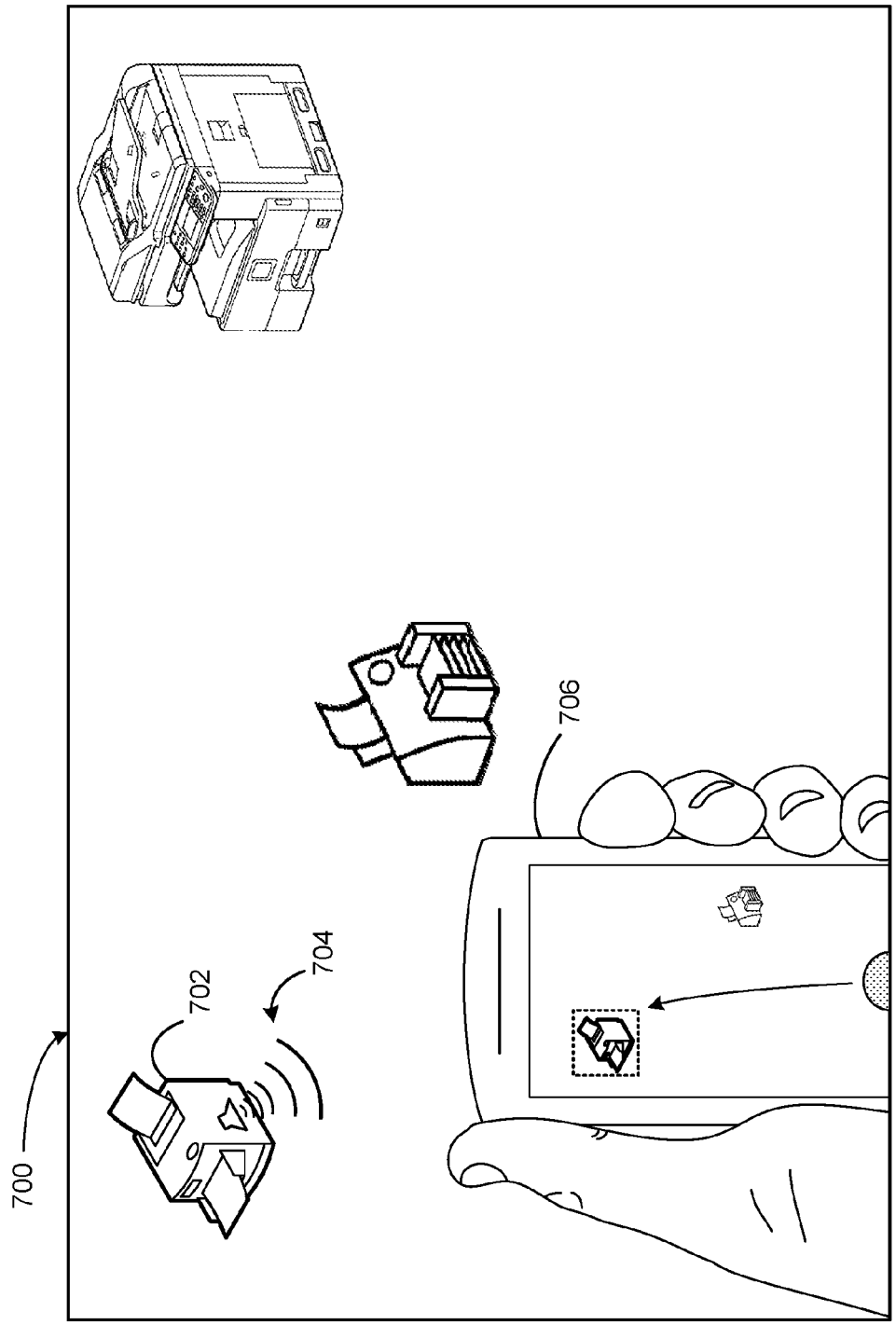
FIG. 7 is an example illustration of a scenario with indoor positioning, according to an example embodiment.

FIG. 7 is an example illustration of a scenario 700 with indoor positioning, according to an example embodiment. In this example, printing device 702 has a speaker that is emitting sound waves 704. The mobile computing device 706 displays the relative location of the printing device 702 on its display unit to guide the user to the printing device 702.

In some instances, the sound waves 704 may be at a frequency above the human-audible range. For example, the sound waves 704 may be ultrasound waves at a frequency greater than 20 kHz.

During operation, the mobile computing device may request to print a document on a particular printer. A printer management device may generate a print job and transmit that print job to be executed on the printing device 702. Then, the printer management device might instruct the printing device 702 to emit sound waves at a particular frequency. The printer management device might also instruct the mobile computing device 706 to begin "listening" for sound waves 704 of that particular frequency. The mobile computing device 706 may be equipped with one or more microphones capable of detecting sound waves at that particular frequency. Using various software and/or hardware techniques, the mobile computing device 706 may filter out ambient sounds and determine characteristics of the sound waves 704. Based on those determined characteristics, the mobile computing device may determine an approximate location (including distance and/or direction) of the printing device 702, and subsequently display that approximate location on screen.

In some implementations, the mobile computing device 706 may determine an amplitude (i.e. volume) of the detected wave sounds 704. By comparing the detected amplitude to a known emitted amplitude, the distance between the mobile computing device 706 and the printing device 702 may be estimated. The distance may be calculated based on a known attenuation of amplitude of the sound waves over a distance.

Furthermore, the mobile computing device 706 may determine an approximate direction of the printing device 702. In some implementations, the mobile computing device 706 may have at least two microphones separated by a known distance. By determining a difference in time it takes for each microphone to receive the sound wave, the relative direction of the printing device 702 may be determined. Additionally, if the time at which the sound waves 704 began emitting is known, determining a length of time taken for the sound waves 704 to travel from the printing device 702 to one or more of the microphones of mobile computing device 706 may be used as a basis for determining the relative location to and distance from the mobile device 706 to the printing device 702.

In some instances, multiple nearby printing devices may be simultaneously emitting sound waves in order to provide indoor positioning for multiple mobile computing devices. In these situations, the printer management device may instruct each printing device to emit sound waves of separate, distinct frequencies. Then, the printer management device may instruct each mobile computing device to "listen" for the frequency corresponding to its associated printing device. By "listening" for a particular frequency and filtering out the other frequencies, a mobile computing device may be able to guide a user to the correct printing device, even though multiple ultrasound waves may reach the mobile computing device simultaneously. The printer management device may keep track of the various printing devices emitting sound and instruct them accordingly to ensure that each printing device emits sound waves of different frequencies.

Figure 8:
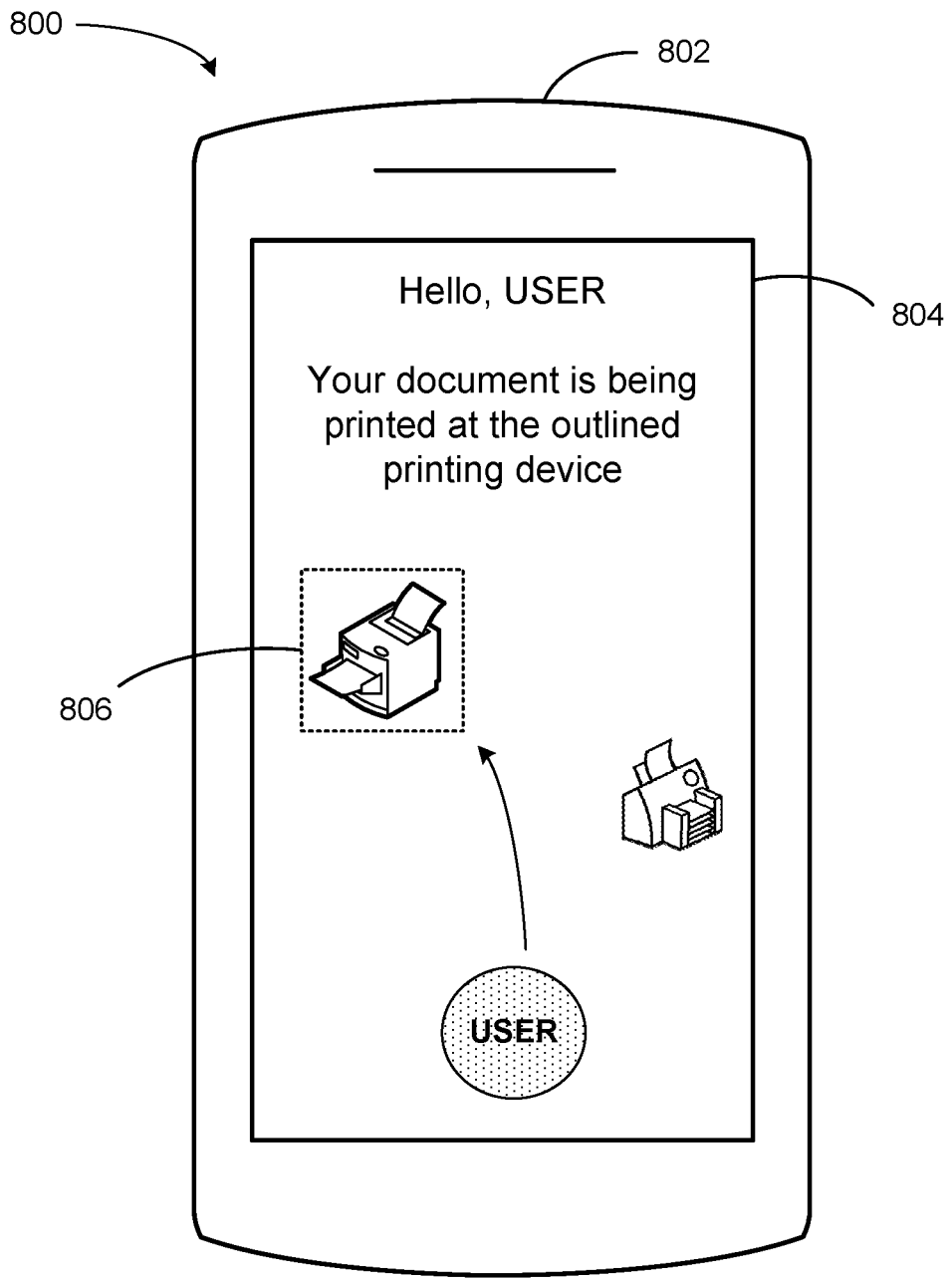
FIG. 8 is a schematic diagram illustrating indoor positioning on a mobile computing device, according to an example embodiment.

FIG. 8 is a schematic diagram 800 illustrating indoor positioning on a mobile computing device 802, according to an example embodiment. The mobile computing device 802 includes a display unit 804 on which an indoor positioning user interface (which may also be referred to herein as a "navigation interface") is provided. The indoor positioning user interface includes a representation of the USER, a representation of the location of the printing device 806 at which the print job is being executed, as well as an arrow representative of the direction along which the USER. In this example, the indoor positioning user interfaces directs the USER to printing device 806 by displaying an arrow direct the user to move forward and to the left.

Note the example illustration shown in FIG. 8 is provided for explanatory purposes. The indoor positioning user interface may take on a variety of forms using any combination of graphical elements to display the USER, one or more printing devices, and a direction or path guiding the USER to the printing device 806.

V. VARIATIONS

In some cases, a user may not select a printing device with which to execute a print job. In these cases, the printer management device may automatically select a printing device on which to execute the print job. This automatic selection of a printing device may be based on one or more factors. As one example, when the user is registered, the selection of the printing device may be based on that user's printing history and/or preferences set by that user. As another example, the location from which the user sent the request to print a document may be determined, and a printing device within close proximity of that location may be selected automatically. As yet another example, the user may specify print job settings that can only be executed on certain printing devices; in such an example, the printer management device may ensure that the automatically selected printing device is capable of performing the specified print job settings (e.g. capable of printing in color, capable of two-sided printing, capable of stapling the document, etc.).

In other cases, a user may select a printing device that is unable to execute the print job. A printing device may be unable to complete a print job or is otherwise unavailable due to an operation error (such as a print jam), due to low ink and/or toner, or may be shut down or taken offline for maintenance purposes. The printer management device may select an alternative printing device in such cases. In some embodiments, the printer management device may notify the user's client device or mobile computing device that the user's selected printing device is unavailable, and prompt the user to select a suitable alternative.

Furthermore, the printer management device may detect a long wait time before the user's document can be printed (due to, for example, a large number of print jobs spooled or queued). In these cases, the printer management device may notify the user's client device or mobile computing device of the potential delay and prompt the user to optionally select an available printing device if the user wishes to avoid such delay.

VI. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A device comprising:
   a network interface configured to communicatively connect to a local network and a wide area network, wherein the local network includes one or more printing devices;
   a storage medium configured to store one or more printer drivers, and
   at least one processor configured to execute instructions comprising:
      receiving, via the network interface, a request to print a document file, wherein the document file is a first document file;
      determining a particular printing device of the one or more printing devices with which to print the document file;
      determining whether a particular printer driver for the particular printing device is among the one or more printer drivers stored on the storage medium;
      upon determining that the particular printer driver is not stored on the storage medium, retrieving, via the network interface, the printer driver from a server over the wide area network;
      converting, using the particular printer driver, the document file into a print job, wherein the print job is a first print job;
      transmitting, to the particular printing device via the network interface, instructions to execute the print job;
      receiving a request to retrieve and print a second document file from cloud storage over the wide area network and responsively retrieving the second document file;
      converting, using the particular printer driver, the second document file into a second print job; and
      transmitting, to the particular printing device via the network interface, instructions to execute the second print job.

2. The device of claim 1, wherein the request includes user information, wherein the device further comprises an operation panel, and wherein the instructions further comprise:
   determining an operation panel display configuration for a user associated with the user information stored on the storage medium, wherein the operation panel display configuration is a user-specific arrangement of graphical elements representative of operations that can be performed on the device; and
   causing a mobile computing device to display the operation panel display configuration.

3. The device of claim 1, wherein the instructions further comprise:
   receiving status information from the particular printing device;

based on the status information indicating that the particular printing device is busy, determining an alternative printing device of the one or more printing devices with which to print the document file; and transmitting, to the alternative printing device via the network interface, instructions to execute the print job.

4. The device of claim 1, wherein the instructions further comprise:

receiving a notification that an error occurred while the particular printing device executed the print job;

upon receiving the notification, determining an alternative printing device of the one or more printing devices with which to print the document file; and transmitting, to the alternative printing device via the network interface, instructions to execute the print job.

5. A device comprising:

a network interface configured to communicatively connect to a local network and a wide area network, wherein the local network includes one or more printing devices;

a storage medium configured to store one or more printer drivers; and at least one processor configured to execute instructions comprising:

receiving, via the network interface, a request to print a document file, wherein the request includes user information;

determining a particular printing device of the one or more printing devices with which to print the document file;

determining whether a particular printer driver for the particular printing device is among the one or more printer drivers stored on the storage medium;

upon determining that the particular printer driver is not stored on the storage medium, retrieving, via the network interface, the printer driver from a server over the wide area network;

converting, using the particular printer driver, the document file into a print job;

transmitting, to the particular printing device via the network interface, instructions to execute the print job;

determining whether a user associated with the user information is permitted to execute printing; and based on the user not being permitted to execute printing, preventing the transmission of the instructions to execute the print job.

6. The device of claim 5, wherein the request includes user information, wherein the device further comprises an operation panel, and wherein the instructions further comprise:

determining an operation panel display configuration for a user associated with the user information stored on the storage medium, wherein the operation panel display configuration is a user-specific arrangement of graphical elements representative of operations that can be performed on the device; and causing a mobile computing device to display the operation panel display configuration.

7. The device of claim 5, wherein the instructions further comprise:

receiving status information from the particular printing device;

based on the status information indicating that the particular printing device is busy, determining an alternative printing device of the one or more printing devices with which to print the document file; and transmitting, to the alternative printing device via the network interface, instructions to execute the print job.

8. The device of claim 5, wherein the instructions further comprise:

receiving a notification that an error occurred while the particular printing device executed the print job;

upon receiving the notification, determining an alternative printing device of the one or more printing devices with which to print the document file; and transmitting, to the alternative printing device via the network interface, instructions to execute the print job.

9. A device comprising:

a network interface configured to communicatively connect to a local network and a wide area network, wherein the local network includes one or more printing devices;

a storage medium configured to store one or more printer drivers; and at least one processor configured to execute instructions comprising:

receiving, via the network interface, a request to print a document file;

determining a particular printing device of the one or more printing devices with which to print the document file;

determining whether a particular printer driver for the particular printing device is among the one or more printer drivers stored on the storage medium;

upon determining that the particular printer driver is not stored on the storage medium, retrieving, via the network interface, the printer driver from a server over the wide area network;

converting, using the particular printer driver, the document file into a print job;

transmitting, to the particular printing device via the network interface, instructions to execute the print job;

receiving, from a given printing device of the one or more printing devices, scan data representative of a document scanned by the given printing device and a scan destination indicative of a location at which to store the scan data; and storing the received scan data at the scan destination.

10. The device of claim 9, wherein the request includes user information, wherein the device further comprises an operation panel, and wherein the instructions further comprise:

determining an operation panel display configuration for a user associated with the user information stored on the storage medium, wherein the operation panel display configuration is a user-specific arrangement of graphical elements representative of operations that can be performed on the device; and causing a mobile computing device to display the operation panel display configuration.

11. The device of claim 9, wherein the instructions further comprise:

receiving status information from the particular printing device;

based on the status information indicating that the particular printing device is busy, determining an alternative printing device of the one or more printing devices with which to print the document file; and transmitting, to the alternative printing device via the network interface, instructions to execute the print job.

12. The device of claim 9, wherein the instructions further comprise:

receiving a notification that an error occurred while the particular printing device executed the print job;

upon receiving the notification, determining an alternative printing device of the one or more printing devices with which to print the document file; and transmitting, to the alternative printing device via the network interface, instructions to execute the print job.

* * * * *